United States Patent
Toyoda et al.

(10) Patent No.: US 7,579,723 B2
(45) Date of Patent: Aug. 25, 2009

(54) POWER MAGNETIC CORE AND STATOR CORE

(75) Inventors: Haruhisa Toyoda, Itami (JP); Naoto Igarashi, Itami (JP); Hitoshi Oyama, Osaka (JP); Yasuhiro Endo, Toyota (JP); Ryoji Mizutani, Aichi (JP)

(73) Assignees: Sumitomo Electric Industries, Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 172 days.

(21) Appl. No.: 10/583,517

(22) PCT Filed: Dec. 15, 2004

(86) PCT No.: PCT/JP2004/018706

§ 371 (c)(1),
(2), (4) Date: Jun. 4, 2007

(87) PCT Pub. No.: WO2005/060072

PCT Pub. Date: Jun. 30, 2005

(65) Prior Publication Data

US 2007/0241622 A1    Oct. 18, 2007

(30) Foreign Application Priority Data

Dec. 17, 2003    (JP) .............................. 2003-419438

(51) Int. Cl.
*H02K 1/02* (2006.01)
(52) U.S. Cl. .......................... 310/44; 310/216; 336/233
(58) Field of Classification Search ................... 310/44, 310/216–218; 336/200, 219, 233; 252/62.54, 252/62.55
See application file for complete search history.

(56) References Cited

U.S. PATENT DOCUMENTS

| | | | | |
|---|---|---|---|---|
| 4,392,072 A | * | 7/1983 | Rosenberry | 310/216 |
| 4,698,539 A | * | 10/1987 | Workman | 310/216 |
| 4,899,074 A | * | 2/1990 | West | 310/154.27 |
| 4,947,065 A | * | 8/1990 | Ward et al. | 310/44 |
| 5,532,531 A | * | 7/1996 | Sakamoto | 310/49 R |
| 6,300,702 B1 | * | 10/2001 | Jack et al. | 310/216 |
| 6,812,608 B2 | * | 11/2004 | Nakazawa et al. | 310/154.11 |

FOREIGN PATENT DOCUMENTS

| | | |
|---|---|---|
| JP | 8-167518 A | 6/1996 |
| JP | 10-335128 A | 12/1998 |
| JP | 11-238614 A | 8/1999 |
| JP | 2002-112513 A | 4/2002 |
| JP | 2002-343618 A | 11/2002 |
| JP | 2003-235186 A | 8/2003 |

\* cited by examiner

*Primary Examiner*—Tran N Nguyen
(74) *Attorney, Agent, or Firm*—McDermott Will & Emery LLP (57) ABSTRACT

A power magnetic core has a start section and a termination section. In the powder magnetic core, lines of magnetic force are formed from the start section to the termination section. The powder magnetic core comprises a first portion disposed on the shortest magnetic path of the lines of magnetic force that connects the start section and the termination section and having a permeability μa and a second portion disposed apart from the shortest magnetic path of the lines of magnetic force and having a permeability μb greater than μa. With this constitution, a desired magnetic characteristic is achieved, and the iron loss is sufficiently reduced.

6 Claims, 9 Drawing Sheets

POWER MAGNETIC CORE AND STATOR CORE

Related Applications

This application is the U.S. National Phase under 35 U.S.C. § 371 of International Application No. PCT/JP2004/018706, filed on Dec. 15, 2004, which in turn claims the benefit of Japanese Application No. 2003-419438, filed on Dec. 17, 2003, the disclosures of which Applications are incorporated by reference herein.

TECHNICAL FIELD

The present invention generally relates to a power magnetic core and a stator core, and more specifically, it relates to a power magnetic core and a stator core each prepared by pressure-forming magnetic powder.

BACKGROUND ART

Preparation of a magnetic core employed as a stator core of an electric motor or the like by pressure-forming soft magnetic powder is known in general. In this case, a high permeability can be easily obtained as compared with a case of preparing a magnetic core by superposing a plurality of electromagnetic steel plates. Further, the magnetic core can be integrally molded also when the same has a complicated structure.

In relation to a power magnetic core obtained by pressure-forming soft magnetic powder in this manner, Japanese Patent Laying-Open No. 10-335128, for example, discloses a power magnetic core aimed at implementing high magnetic flux density, low coercive force and low loss and having high mechanical strength and a method of manufacturing the same (Patent Document 1). On the other hand, Japanese Patent Laying-Open No. 2003-235186 discloses a method of manufacturing a magnetogenerator by circumferentially combining a plurality of generation coils with each other in order to attain downsizing (Patent Document 2).

Further, Japanese Patent Laying-Open No. 8-167518 discloses a high-frequency power magnetic core aimed at reducing hysteresis loss and further reducing iron loss and a method of manufacturing the same (Patent Document 3). The high-frequency power magnetic core disclosed in Patent Document 3 is prepared by compacting flattened shape-anisotropic soft magnetic powder in the form of a ring. At this time, the high-frequency power magnetic core is so prepared that the major axis direction of the shape-anisotropic soft magnetic powder is toward the radial direction of the ring on the assumption that the major axis of the shape-anisotropic soft magnetic powder is the hard axis of magnetization and the minor axis is the easy axis of magnetization.

In addition, Japanese Patent Laying-Open No. 11-238614 discloses a soft magnetic material aimed at having a high permeability and high saturation magnetic flux density as well as an excellent frequency characteristic and excellent mechanical strength and an electric apparatus employing the same (Patent Document 4). The stator of an electric motor disclosed in Patent Document 4 is prepared by pressure-forming magnetic powder composed of metal particles and metal oxides covering the metal particles.

Patent Document 1: Japanese Patent Laying-Open No. 10-335128

Patent Document 2: Japanese Patent Laying-Open No. 2003-235186

Patent Document 3: Japanese Patent Laying-Open No. 8-167518

Patent Document 4: Japanese Patent Laying-Open No. 11-238614

DISCLOSURE OF THE INVENTION

Problems to be Solved by the Invention

Figure 11:
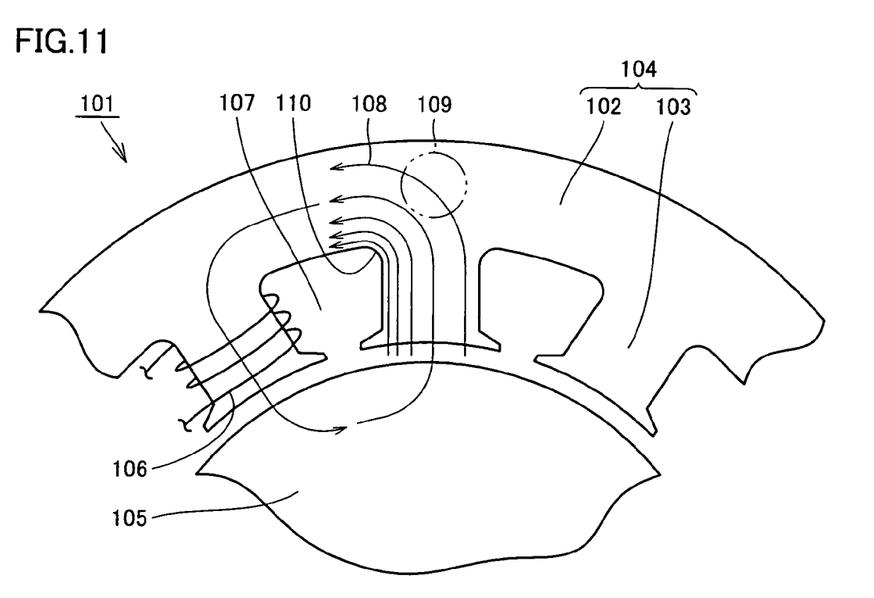
[FIG. 11] A front elevational view of an electric motor for illustrating energy loss resulting from irregularity of magnetic flux.

In each of Patent Document 1 and 2, the power magnetic core or cores constituting the generation coils are entirely made of a uniform material, and hence no spatial distribution of the permeability is present. Therefore, magnetic flux is irregularized in the power magnetic core or the cores constituting the generation coils, and energy loss results from local magnetic saturation. FIG. 11 is a front elevational view of an electric motor for illustrating energy loss resulting from irregularity of magnetic flux. The aforementioned energy loss is described with reference to FIG. 11.

An electric motor 101 comprises a stator core 104 constituted of a yoke portion 102 and a plurality of teeth portions 103 and a rotor core 105 stored in stator core 104. A slot portion 107 is defined in an area enclosed with yoke portion 102 and each adjacent pair of teeth portions 103. A coil 106 is concentratedly wound on each of plurality of teeth portions 103.

When sinusoidal alternating current is introduced into coil 106, magnetic flux flows in electric motor 101 to form lines of magnetic force 108 following prescribed annular paths. At this time, the magnetic flux flows to follow the shortest magnetic path, whereby lines of magnetic force 108 are densely formed in an area along slot portion 107, particularly in a corner portion 110 of teeth portion 103 and yoke portion 102 in this area. To the contrary, lines of magnetic force 108 are roughly formed in an area 109 of yoke portion 102 apart from corner portion 110.

When lines of magnetic force 108 are formed in such irregular distribution, magnetic saturation results in the area where lines of magnetic force 108 are densely formed. Therefore, magnetic flux density in stator core 104 is detected in a distorted waveform, although the sinusoidal alternating current is introduced into coil 106. The magnetic flux density detected in this manner includes a large number of harmonic components, to result in such a problem that iron loss in stator core 104 is increased as a result.

On the other hand, the high-frequency power magnetic core disclosed in Patent Document 3 is so formed that the major axis direction of the shape-anisotropic soft magnetic powder is toward the radial direction of the ring. In other words, the power magnetic core is so formed that the minor axis direction of the soft magnetic powder coincides with the direction (circumferential direction of the ring) where the magnetic flux flows.

When the soft magnetic powder is pressure-formed under a high pressure, however, the power magnetic core is obtained as such a high-density compact that a plurality of particles constituting the soft magnetic powder are in proximity to each other. Therefore, the interparticle distance is shortened, and magnetic anisotropy of each particle is extremely reduced. In such a high-density compact, therefore, the presence of grain boundaries of the soft magnetic powder exerts remarkable influence on the permeability of the power magnetic core.

In other words, magnetic flux flows along the minor axis direction of the soft magnetic powder and hence the frequency of the magnetic flux passing the grain boundaries of the soft magnetic powder is increased per unit length in the high-frequency power magnetic core disclosed in Patent Document 3. The flow of the magnetic flux is hindered when the grain boundaries of the soft magnetic powder are present, to result in such a problem that the permeability of the power magnetic core is reduced.

In the stator of the electric motor disclosed in Patent Document 4, the magnetic powder comprising the metal particles covered with metal oxide films is employed in order to suppress eddy current flowing between the metal particles. When the true density of the stator of the electric motor is increased in order to attain high magnetic flux density, however, the metal oxide films covering the metal particles may be broken in pressure forming. In this case, such a problem arises that iron loss resulting from interparticle eddy current is increased.

Accordingly, objects of the present invention are to solve the aforementioned problems, and to provide a power magnetic core and a stator core each having desired magnetic characteristics while sufficiently attaining reduction of iron loss.

Means for Solving the Problems

A power magnetic core according to an aspect of the present invention has a start section and a termination section, and is formed therein with lines of magnetic force extending from the start section toward the termination section. The power magnetic core comprises a first portion, having a permeability $\mu a$, disposed on the shortest magnetic path of the lines of magnetic force connecting the start section and the termination section with each other and a second portion, having a permeability $\mu b$ greater than $\mu a$, disposed apart from the shortest magnetic path of the lines of magnetic force.

According to the power magnetic core having this structure, magnetic flux easily flows in the second portion disposed apart from the shortest magnetic path as compared with the first portion, due to the relatively large permeability $\mu b$. Although the magnetic flux has a property of concentratedly flowing in the first portion in order to minimize the magnetic path length, therefore, the lines of magnetic force formed in the power magnetic core can be inhibited from causing irregularity between the first and second portions. Thus, the first portion can be prevented from local magnetic flux saturation, and iron loss of the power magnetic core can be reduced.

Preferably, the first portion contains soft magnetic powder having a relatively small average particle diameter. The second portion contains soft magnetic powder having a relatively large average particle diameter. According to the power magnetic core having this structure, the frequency of magnetic flux passing grain boundaries of the soft magnetic powder is relatively increased in the first portion and relatively reduced in the second portion per unit length. Also when the power magnetic core is constituted of the soft magnetic powder made of the same material, therefore, the permeability of the first portion can be relatively reduced and the permeability of the second portion can be relatively increased by properly controlling the particle diameters.

Preferably, the first portion contains iron powder. The second portion contains at least either Permalloy powder or Sendust powder. According to the power magnetic core having this structure, the second portion contains the Permalloy powder having a high permeability or the Sendust powder having a high permeability, low magnetic anisotropy and low magnetic strain. Therefore, the permeability of the second portion can be increased with respect to the first portion containing the iron powder.

A stator core according to the aspect of the present invention is a stator core prepared by employing the power magnetic core described in any of the above. The stator core comprises an annularly extending yoke portion, a first teeth portion and a second teeth portion. The first teeth portion protrudes from the yoke portion in the radial direction of the yoke portion, so that the start section is disposed on the protruding forward end. The second portion protrudes from the yoke portion in the radial direction of the yoke portion so that the termination section is disposed on the protruding forward end, and is adjacent to the first teeth portion at an interval. A slot portion is defined in a space enclosed with the first and second teeth portions and the yoke portion. The first portion extends along the slot portion, and the second portion extends on the opposite side of the slot portion with respect to the first portion.

According to the stator core having this structure, alternating current is so introduced as to form magnetic flux successively flowing from the first teeth portion to the yoke portion and from the yoke portion to the second teeth portion in the stator core. At this time, the magnetic flux tends to concentratedly flow to the first section along the slot portion, in order to take the shortest magnetic path. However, the magnetic flux can be equally fed to the first and second portions by forming the second portion having the relatively large permeability around the first portion. Thus, local magnetic flux saturation can be prevented in the stator core, and iron loss in the stator core can be reduced.

A power magnetic core according to another aspect of the present invention has a start section and a termination section, and is formed therein with lines of magnetic force extending in a prescribed direction from the start section toward the termination section. The power magnetic core comprises a plurality of flat soft magnetic particles, each including a major axis and a minor axis, bonded to each other. Each of the plurality of soft magnetic particles is so bonded that the extensional direction of the major axis and the extensional direction of the lines of magnetic force substantially coincide with each other.

According to the power magnetic core having this structure, the extensional direction of the major axis of the soft magnetic particles and the extensional direction of the lines of magnetic force so coincide that the frequency of magnetic flux passing grain boundaries of the soft magnetic particles can be reduced per unit length. Thus, the permeability of the power magnetic core can be improved, so that iron loss of the power magnetic core can be reduced.

A stator core according to this aspect of the present invention is a stator core prepared by employing the aforementioned power magnetic core. The stator core comprises an annularly extending yoke portion and a plurality of teeth portions, protruding from the yoke portion in the radial direction of the yoke portion, provided at intervals from each other. Each of the plurality of soft magnetic particles forming the yoke portion is so bonded that the extensional direction of the major axis and the extensional circumferential direction of the yoke portion substantially coincide with each other. Each of the plurality of soft magnetic particles forming the teeth portions is so bonded that the extensional direction of the major axis and the radial direction of the yoke portion substantially coincide with each other.

According to the stator core having this structure, alternating current is so introduced as to form magnetic flux successively flowing from a teeth portion to the yoke portion and from the yoke portion to another teeth portion adjacent to the said teeth portion in the stator core. At this time, the magnetic flux flows in the extensional circumferential direction of the yoke portion in the yoke portion, and flows in the radial direction of the yoke portion, i.e., the protruding direction of the teeth portions in the teeth portions. Therefore, the extensional direction of the major axes of the soft magnetic particles and the extensional direction of the lines of magnetic force can coincide with each other in the respective ones of the yoke portion and the teeth portions. Thus, the permeability of the stator core can be improved, so that iron loss of the stator core can be reduced.

Preferably, the teeth portions include forward end portions disposed on the protruding forward ends of the teeth portions to face a separately provided rotor core. The forward end portions are formed by a plurality of spherical soft magnetic particles bonded to each other. In the stator core having this structure, the direction of the magnetic flux traveling between the rotor core and the teeth portions regularly changes following rotation of the rotor core. According to the present invention, however, the forward end portions of the teeth portions changing the direction of the magnetic flux are formed by the spherical soft magnetic particles. Thus, magnetic isotropy can be ensured on these portions, whereby the permeability can be prevented from reduction resulting from the direction of the magnetic flux.

Preferably, a slot portion is defined in a space enclosed with two adjacent teeth portions and the yoke portion. The yoke portion and the plurality of teeth portions include a first portion extending along the slot portion and a second portion extending on the opposite side of the slot portion with respect to the first portion. The first portion has a permeability μa, and the second portion has a permeability μb greater than μa.

According to the stator core having this structure, the magnetic flux tends to concentratedly flow to the first section along the slot portion, in order to take the shortest magnetic path. However, the magnetic flux can be equally fed to the first and second portions by forming the second portion having the relatively large permeability around the first portion. Thus, local magnetic flux saturation can be prevented in the stator core, and iron loss in the stator core can be further reduced.

Preferably, the average length of the major axis is relatively small in the plurality of flat soft magnetic particles forming the first portion, and the average length of the major axis is relatively large in the plurality of flat soft magnetic particles forming the second portion. According to the stator core having this structure, the frequency of the magnetic flux passing grain boundaries is relatively increased in the first portion and relatively reduced in the second portion per unit length. Also when employing the soft magnetic particles of the same material, therefore, the permeability of the first portion can be relatively reduced and the permeability of the second portion can be relatively increased by properly controlling the particle diameters thereof.

Effect of the Invention

According to the present invention, as hereinabove described, a power magnetic core and a stator core each having desired magnetic characteristics while sufficiently attaining reduction of iron loss can be provided.

DESCRIPTION OF REFERENCE NUMERALS 2 rotor core, 10, 30, 40, 50, 60 stator core, 11 yoke portion, 12, 12m, 12n teeth portion, 14 slot portion, 15 start section, 16 termination section, 17 first portion, 18 second portion, 19 forward end portion, 20 line of magnetic force, 51, 51p, 51q, 61 soft magnetic particle, 52 major axis, 53 minor axis.

BEST MODES FOR CARRYING OUT THE INVENTION

Embodiments of the present invention are described with reference to the drawings.

First Embodiment

Figure 1:
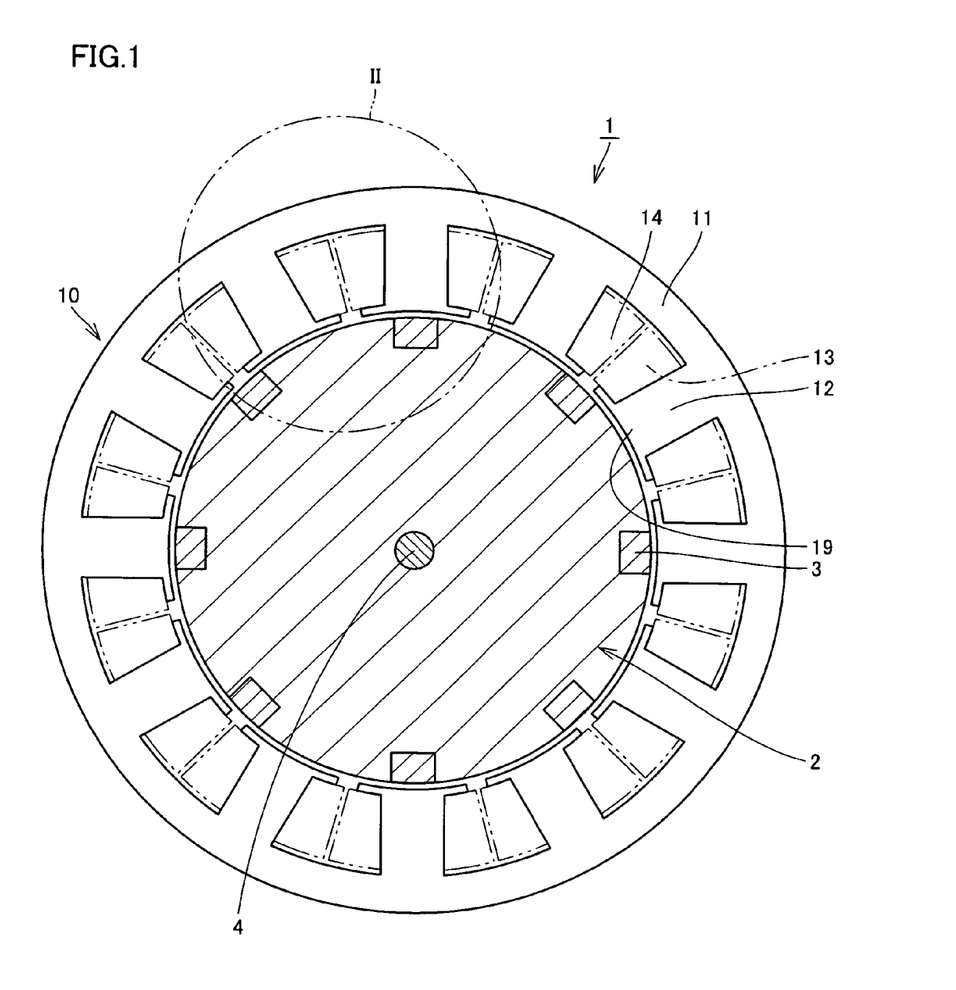
[FIG. 1] A sectional view showing an electric motor employing a stator core according to a first embodiment of the present invention.

Referring to FIG. 1, an electric motor 1 comprises a ring-like stator core 10 and a cylindrical rotor core 2 arranged on the inner peripheral side of stator core 10. Rotor core 2 has a rotational axis 4 on the central portion. Rotor core 2 so rotates about rotational axis 4 that electric motor 1 outputs rotational movement. Permanent magnets 3 are embedded in the peripheral edge of rotor core 2 every prescribed angle.

Stator core 10 is constituted of an annularly extending yoke portion 11 and a plurality of teeth portions 12 protruding from yoke portion 11 toward the inner peripheral side of yoke portion 11. Plurality of teeth portions 12 are provided at intervals from each other every prescribed angle. Teeth portions 11 zonally extend from yoke portion 11 in the radial direction of yoke portion 11. Teeth portions 12 have forward end portions 19 facing the outer peripheral surface of rotor core 2 on the protruding forward ends of teeth portions 12. Forward end portions 19 are so formed that the circumferential width of yoke portion 11 is larger than those of the remaining portions of teeth portions 12. Coils 13 are concentratedly wound on teeth portions 12.

Figure 2:
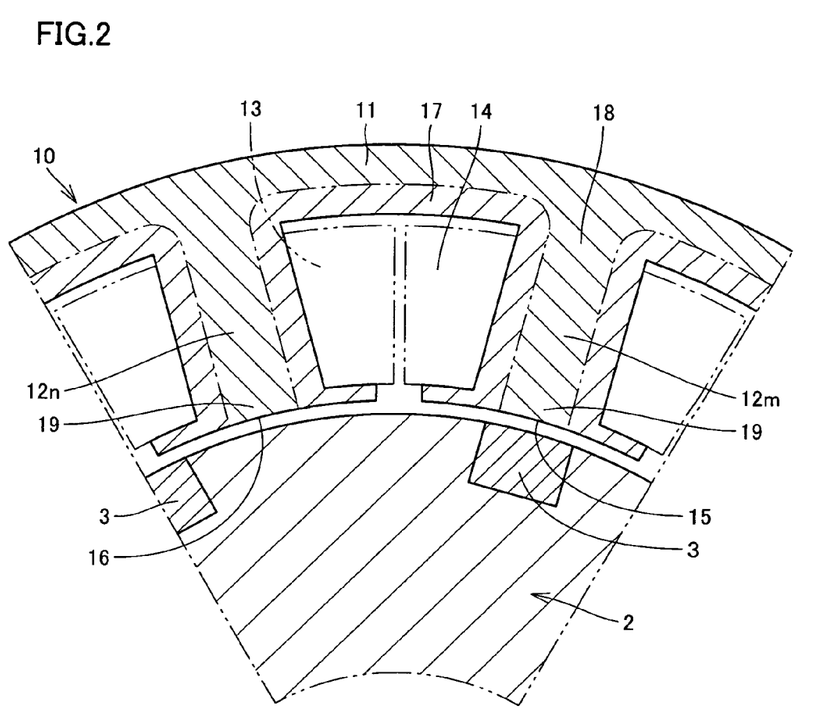
[FIG. 2] A sectional view showing a range enclosed with a two-dot chain line II in FIG. 1 in an enlarged manner.

Referring to FIG. 2, a slot portion 14 is defined in a space enclosed with yoke portion 11 and adjacent teeth portions 12m and 12n. Slot portion 14 is open on the inner peripheral side facing rotor core 2. Coils 13 wound on teeth portions 12m and 12n respectively are partially positioned on slot portion 14. A start section 15 is defined on the part of teeth portion 12*m* where forward end portion 19 faces the outer peripheral surface of rotor core 2, while a termination section 16 is defined on the part of teeth portion 12*n* where forward end portion 19 faces the outer peripheral surface of rotor core 2.

Stator core 10 includes a first portion 17 zonally extending along slot portion 14 over start section 15 and termination section 16 and a second portion 18 occupying the area excluding first portion 17. Second portion 18 is disposed on the opposite side of slot portion 14 with respect to first portion 17. Second portion 18 zonally extends in the radial direction of yoke portion 11 in an area enclosed with first portion 17 in each teeth portion 12, and zonally extends in the circumferential direction of yoke portion 11 on the outer peripheral side beyond first portion 17.

Stator core 10 is formed by a power magnetic core obtained by pressure-forming soft magnetic powder. The soft magnetic powder is an aggregate of a plurality of soft magnetic particles. The average particle diameter Db of soft magnetic particles disposed on second portion 18 is greater than the average particle diameter Da of soft magnetic particles disposed on first portion 17. The average particle diameter Da is about 100 μm, for example, and the average particle diameter Db is greater than 100 μm. The average particle diameters of the soft magnetic particles are so controlled in this manner that first portion 17 is formed with a permeability μa and second portion 18 is formed with a permeability μb greater than μa.

The average particle diameter indicates the particle diameter of such particles that the sum of masses from that having the minimum particle diameter reaches 50% of the total mass in a histogram of particle diameters measured by a screening method, i.e., the 50% particle diameter D.

Metal magnetic particles covered with insulating coatings are employed as the soft magnetic particles. For example, iron (Fe), an iron (Fe)-silicon (Si)-based alloy, an iron (Fe)-nitrogen (N)-based alloy, an iron (Fe)-nickel (Ni)-based alloy, an iron (Fe)-carbon (C)-based alloy, an iron (Fe)-boron (B)-based alloy, an iron (Fe)-cobalt (Co)-based alloy, an iron (Fe)-phosphorus (P)-based alloy, an iron (Fe)-nickel (Ni)-cobalt (Co)-based alloy or an iron (Fe)-aluminum (Al)-silicon (Si)-based alloy can be employed as the metal magnetic particles.

The insulating coatings are formed by phosphating the metal magnetic particles, for example. Preferably, the insulating coatings contain an oxide. An oxide insulator such as manganese phosphate, zinc phosphate, calcium phosphate, silicon oxide, titanium oxide, aluminum oxide or zirconium oxide can be used as the insulating coatings containing the oxide, in addition to iron phosphate containing phosphorus and iron.

The insulating coatings function as insulating layers between the metal magnetic particles. The electric resistance ρ of the soft magnetic powder can be increased by covering the metal magnetic particles with the insulating coatings. Thus, eddy current can be inhibited from flowing between the metal magnetic particles, for reducing iron loss of stator core 10 resulting from the eddy current.

Figure 3:
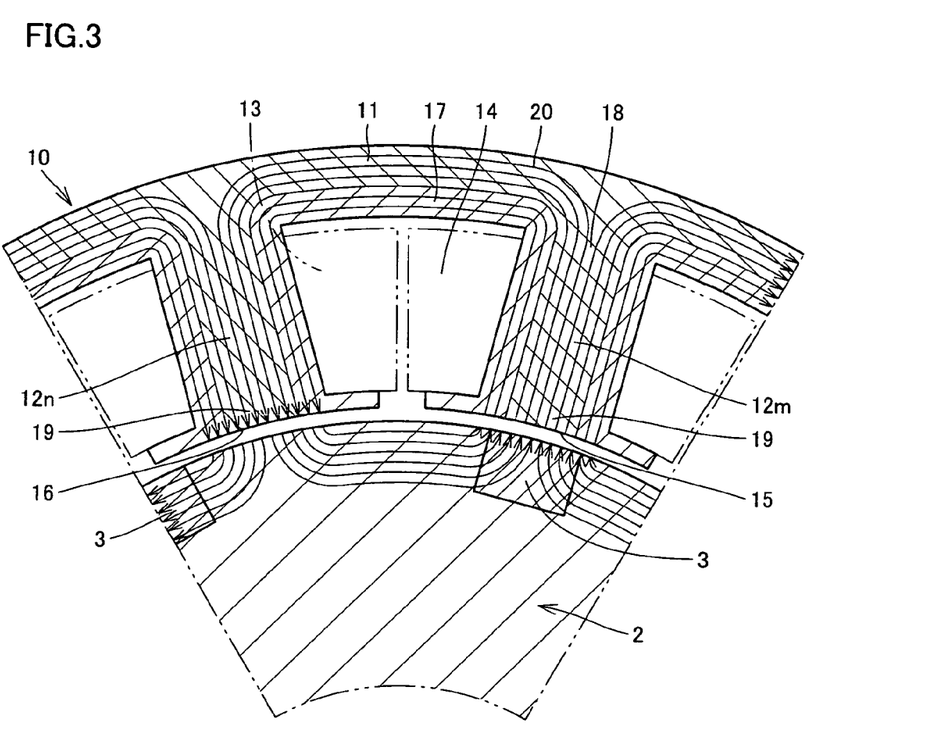
[FIG. 3] A sectional view of the electric motor showing lines of magnetic force formed on the stator core.

Referring to FIG. 3, magnetic flux flows in an annular circuit successively following teeth portion 12*m*, yoke section 11, teeth portion 12*b* and rotor core 2. Consequently, lines of magnetic force 20 flowing from start section 15 toward termination section 16 are formed in stator core 10.

At this time, the magnetic flux, directed to follow the shortest magnetic path connecting start section 15 and termination section 16 with each other, tends to concentratedly flow to first portion 17 disposed on the shortest magnetic path. However, second portion 18 has the greater permeability than first portion 17 so that the magnetic flux easily flows, whereby the magnetic flux can be inhibited from concentratedly flowing to first portion 17. Thus, lines of magnetic force 20 are formed at substantially regular intervals over first portion 17 and second portion 18.

The power magnetic core according to the first embodiment of the present invention has start section 15 and termination section 16, and is formed therein with lines of magnetic force 20 extending from start section 15 toward termination section 16. The power magnetic core comprises first portion 17, having permeability μa, disposed on the shortest magnetic path of lines of magnetic force 20 connecting start section 15 and termination section 16 with each other and second portion 18, having permeability μb greater than μa, disposed apart from the shortest magnetic path of lines of magnetic force 20.

Stator core 10 comprises annularly extending yoke portion 11, teeth portion 12*m* serving as a first teeth portion and teeth portion 12*n* serving as a second teeth portion. Teeth portion 12*m* protrudes from yoke portion 11 in the radial direction of yoke portion 11, so that start section 15 is disposed on the protruding forward end. Teeth portion 12*n* protrudes from yoke portion 11 in the radial direction of yoke portion 11 so that start section 16 is disposed on the protruding forward end, and is adjacent to teeth portion 12*m* at an interval. Slot portion 14 is defined in the space enclosed with teeth portions 12*m* and 12*n* and yoke portion 11. First portion 17 extends along slot portion 14, and second portion 18 extends on the opposite side of slot portion 14 with respect to first portion 17.

While this embodiment has been described with reference to the case where stator core 10 is entirely formed by the power magnetic core, only parts of stator core 10, e.g., teeth portions 12 may alternatively be formed by the power magnetic core. In this case, yoke portion 11 is formed by superposing a plurality of electromagnetic steel plates with each other, and stator core 10 is prepared by combining yoke portion 11 and teeth portions 12 with each other, for example. Stator core 10 may further alternatively be formed by combining a plurality of separately pressure-formed compacts with each other.

A method of manufacturing stator core 10 shown in FIG. 1 is now described. First, the metal magnetic particles are prepared, and heat treatment is performed on the metal magnetic cores. The heat treatment is performed at a temperature of at least 100° C. and not more than 1000° C. for at least one hour, for example. Thereafter the insulating coatings are formed on the surfaces of the metal magnetic particles, for preparing two types of soft magnetic powder having different average particle diameters.

Figure 4:
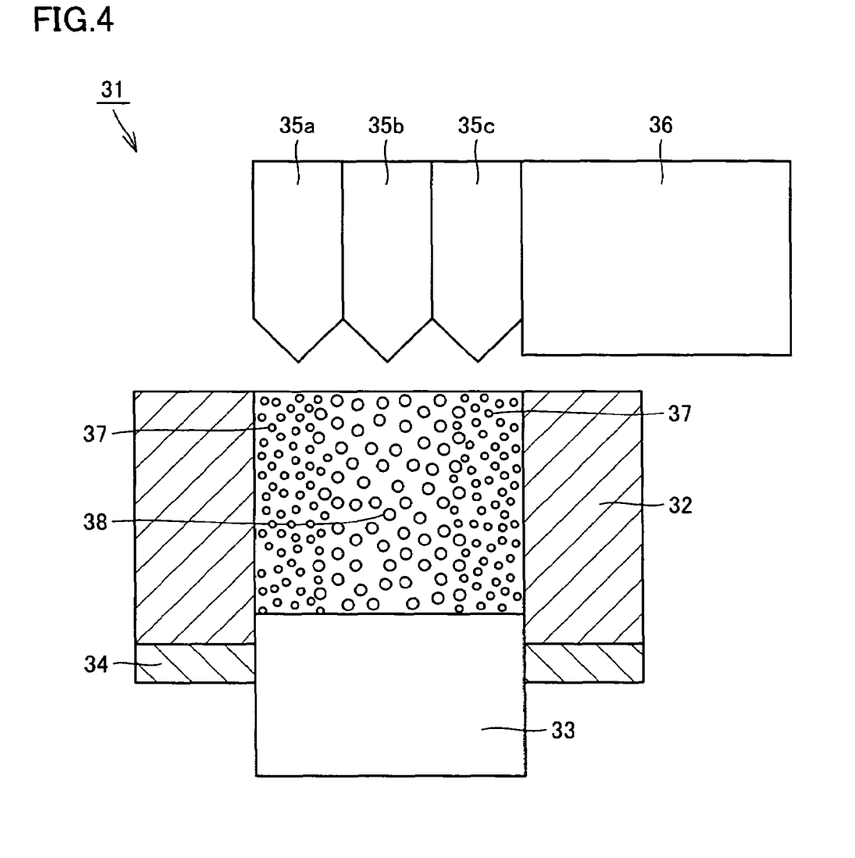
[FIG. 4] A sectional view showing a mold assembly employed in a pressure forming step in the first embodiment of the present invention.

Then, the obtained soft magnetic powder is introduced into a mold, and pressure-formed under a pressure of 700 MPa to 1500 MPa, for example. With reference to FIG. 4 showing a mold assembly employed in the pressure forming step in the first embodiment of the present invention, a method of forming a compact partially different in permeability in the first embodiment of the present invention is described.

A mold assembly 31 comprises a die 32 and a lower punch 33 defining a pressurizing space receiving the soft magnetic powder as well as shoes 35*a* to 35*c* and an upper punch 36 arranged in a line above die 32. Die 32 is provided with a band heater 34 for heating die 32 to a prescribed temperature.

First, soft magnetic powder 38 having a relatively large average particle diameter is set in shoe 35*b*, and soft magnetic powder 37 having a relatively small average particle diameter is set in shoes 35*a* and 35*c*. Band heater 34 is electrified for heating die 32, and the soft magnetic powder set in shoes 35*a* to 35*c* is thereafter introduced into the pressurizing space.

Thus, soft magnetic powder 37 having the relatively small average particle diameter is arranged on both ends of the pressurizing space, while soft magnetic powder 38 having the relatively large average particle diameter is arranged on the central portion of the pressurizing space.

Then, upper punch 36 is moved downward for pressure-forming the soft magnetic powder charged into the pressurizing space. The pressure-forming atmosphere is preferably set to an inert gas atmosphere or a decompressed atmosphere. In this case, mixed powder can be prevented from oxidation with oxygen contained in the atmosphere.

Stator core 10 having first portion 17 and second portion 18 made of the magnetic powder having different average particle diameters can be prepared by applying the aforementioned method. Stator core 10 having different particle diameter distribution can alternatively be prepared by pressure-forming the soft magnetic powder at the room temperature without heating the mold.

Then, stator core 10 obtained by pressure forming is heat-treated at a temperature of at least 400° C. for one hour, for example. Thus, strain and dislocations formed in stator core 10 in pressure forming can be eliminated. Stator core 10 shown in FIG. 1 is completed through the aforementioned steps.

According to stator core 10 having this structure, the magnetic flux can be inhibited from concentratedly flowing onto the shortest magnetic path, whereby first portion 17 can be prevented from magnetic flux saturation. Therefore, flux leakage from first portion 17 toward slot portion 14 can be reduced. Thus, iron loss of stator core 10 can be sufficiently reduced, and a large torque can be obtained in electric motor 1.

Second Embodiment

A stator core according to a second embodiment of the present invention basically comprises a similar structure as compared with stator core 10 according to the first embodiment. Hereinafter redundant description is not repeated as to overlapping structures.

According to this embodiment, soft magnetic particles disposed on a first portion 17 are formed by iron particles covered with insulating coatings, and soft magnetic particles disposed on a second portion 18 are formed by Permalloy particles or Sendust particles covered with insulating coatings. Thus, first portion 17 has a permeability $\mu a$, and second portion 18 has a permeability $\mu b$ greater than $\mu a$. While the average particle diameter Da of the soft magnetic particles disposed on first portion 17 and the average particle diameter Db of the soft magnetic particles disposed on second portion 18 are equal to each other in this embodiment, average particle diameter Db may alternatively be greater than average particle diameter Da.

According to the stator core having this structure, effects similar to the effects described in relation to the first embodiment can be attained.

Third Embodiment

A stator core according to a third embodiment of the present invention basically comprises a similar structure as compared with stator core 10 according to the first embodiment. Hereinafter redundant description is not repeated as to overlapping structures.

According to this embodiment, the overall stator core is formed by soft magnetic particles of the same material having a uniform average particle diameter. However, the stator core is completed by separately preparing a first portion 17 and a second portion 18 and thereafter combining these portions with each other. At this time, first portion 17 is formed with a permeability $\mu a$ and second portion 18 is formed with a permeability $\mu b$ greater than $\mu a$ by setting difference between the thermal hystereses of first and second portions 17 and 18.

A method of manufacturing the stator core according to this embodiment is now described. First, two types of metal magnetic particles equal to each other in average particle diameter and material are separately prepared, and heat treatment is performed only on the first metal magnetic particles. The conditions for the heat treatment are similar to the conditions described with reference to the first embodiment. Thereafter insulating coatings are formed on the surfaces of the metal magnetic particles, for preparing two types of soft magnetic powder having difference resulting from performance/nonperformance of the heat treatment.

Then, the obtained soft magnetic powder is introduced into a mold, and pressure-formed under a pressure of 700 MPa to 1500 MPa, for example. Thus, second portion 18 is prepared from the soft magnetic powder formed by performing the heat treatment on the metal magnetic particles, and first portion 17 is prepared from the soft magnetic powder formed by performing no heat treatment on the metal magnetic particles.

Then, first portion 17 obtained by the pressure forming is heat-treated at a temperature of at least 300° C. and less than 400° C. for one hour, for example. Further, second portion 18 obtained by the pressure forming is heat-treated at a temperature of at least 400° C. for one hour, for example. Thereafter first portion 17 and second portion 18 are combined with each other by press fitting, for example, for completing the stator core.

According to the stator core having this structure, effects similar to the effects described with reference to the first embodiment can be attained.

Fourth Embodiment

Figure 5:
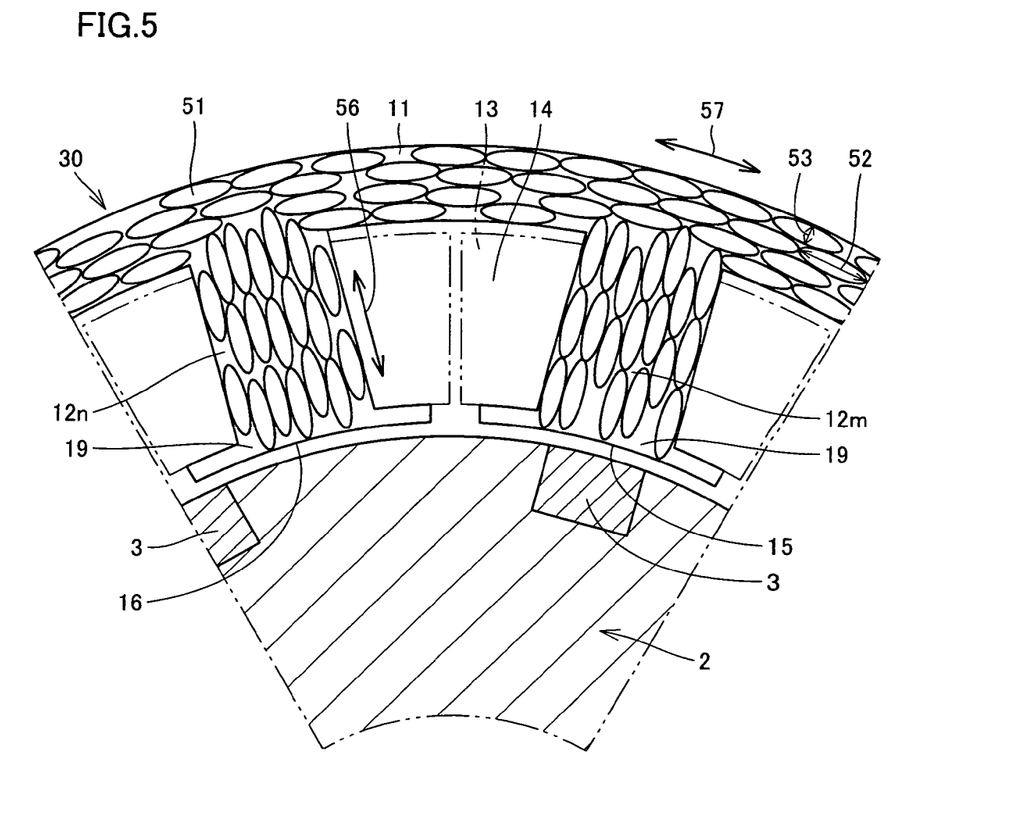
[FIG. 5] A sectional view showing an electric motor employing a stator core according to a fourth embodiment of the present invention.

FIG. 5 showing an electric motor employing a stator core according to a fourth embodiment of the present invention shows a range corresponding to FIG. 2 in the first embodiment, and schematically illustrates soft magnetic particles forming the stator core in an enlarged manner. The stator core according to the fourth embodiment of the present invention basically comprises a structure similar to the stator core 10 according to the first embodiment. Hereinafter redundant description is not repeated as to overlapping structures.

Referring to FIG. 5, a stator core 30 according to this embodiment is formed by a power magnetic core obtained by pressure-forming soft magnetic particles 51 having flat shapes. Each soft magnetic particle 51 has a minor axis 53 and a major axis 52. The soft magnetic particles 51 are formed by the metal magnetic particles and the insulating coatings according to the first embodiment.

While the figure shows spheroidal soft magnetic particles 51, soft magnetic particles 51 may alternatively have elliptic forms. In this case, the major axis of an ellipse constituting an elliptic cylinder forms major axis 52, and the minor axis of the ellipse constituting the elliptic cylinder or the height of the elliptic cylinder forms minor axis 53. The ellipse constituting the spheroid or the elliptic cylinder may not be an ellipse in the strict sense, but may have a circular form specifying a relatively long axis and a relatively short axis.

Soft magnetic particles 51 disposed on teeth portions 12 (12m and 12n in the figure) are so provided that the radial direction (direction shown by arrow 56) of a yoke portion 11 and the extensional direction of major axis 52 coincide with each other. Soft magnetic particles 51 disposed on yoke portion 11 are so provided that the circumferential direction (direction shown by arrows 57) of yoke portion 11 and the extensional direction of major axis 52 coincide with each other.

When alternating current is introduced into coils 13, magnetic flux flows in an annular circuit successively following teeth portion 12m, yoke portion 11, teeth portion 12n and a rotor core 2, and lines of magnetic force from a start section 15 toward a termination section 16 are formed in stator core 30. The extensional direction of the lines of magnetic force coincides with the extensional direction of major axis 52 of soft magnetic particles 51 in each of teeth portions 12 and yoke portion 11.

The power magnetic core according to the fourth embodiment of the present invention has start section 15 and termination section 16, and is formed therein with the lines of magnetic force extending in a prescribed direction from start section 15 toward termination section 16. The power magnetic core comprises plurality of flat soft magnetic particles 51, each having major axis 52 and minor axis 53, bonded to each other. Each of plurality of soft magnetic particles 51 is so bonded that the extensional direction of major axis 52 and the extensional direction of the lines of magnetic force substantially coincide with each other.

Stator core 30 comprises annularly extending yoke portion 11 and plurality of teeth portions 12, protruding from yoke portion 11 in the radial direction of yoke portion 11, provided at intervals from each other. Each of plurality of soft magnetic particles 51 forming yoke portion 11 is so bonded that the extensional direction of major axis 52 and the extensional circumferential direction of yoke portion 11 substantially coincide with each other. Each of plurality of soft magnetic particles 51 forming teeth portions 12 is so bonded that the extensional direction of major axis 52 and the radial direction of yoke portion 11 substantially coincide with each other.

A method of manufacturing the stator core in FIG. 5 is now described. First, flat metal magnetic particles are prepared and prescribed heat treatment is performed on the metal magnetic particles, similarly to the manufacturing method described with reference to the first embodiment. Thereafter insulating coatings are formed on the surfaces of the metal magnetic particles, for preparing soft magnetic powder composed of plurality of soft magnetic particles 51.

Figure 6:
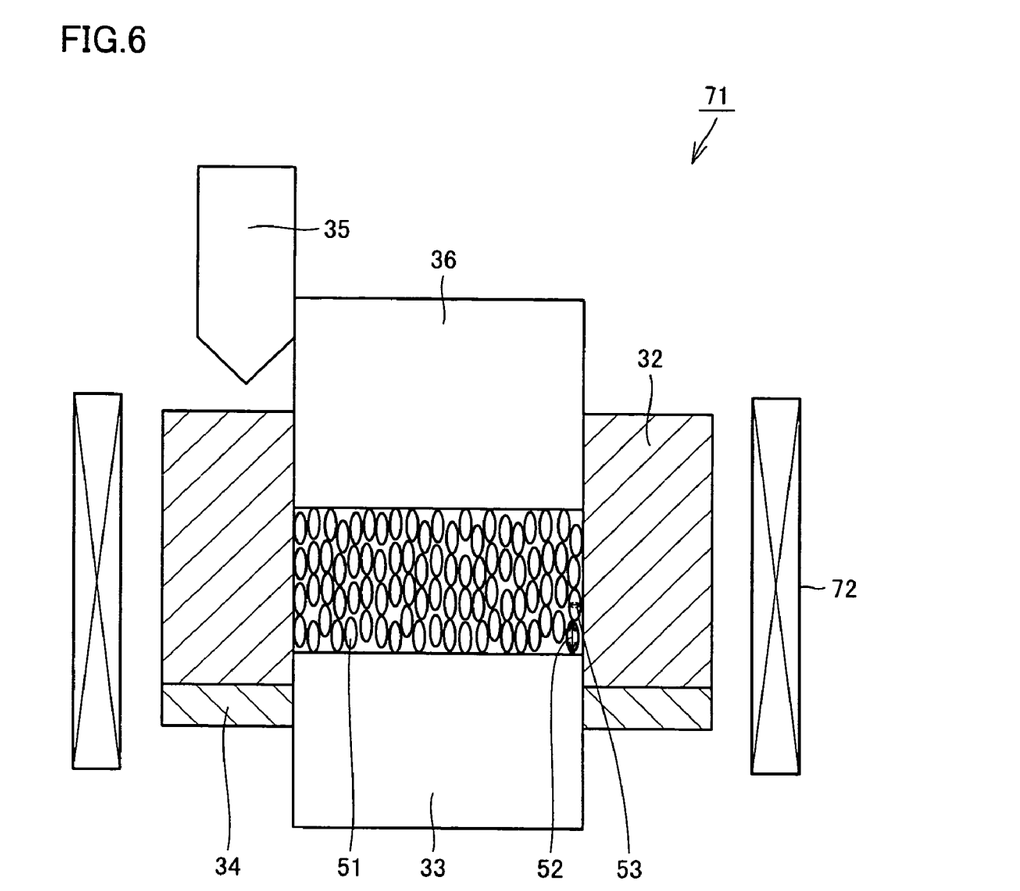
[FIG. 6] A sectional view showing a mold assembly employed in a pressure forming step in the fourth embodiment of the present invention.

Then, the obtained soft magnetic powder is introduced into a mold, and pressure-formed under a pressure of 700 MPa to 1500 MPa, for example. With reference to FIG. 6 showing a mold assembly employed in a pressure forming step in the fourth embodiment of the present invention, a method of forming a compact by orienting the flat soft magnetic particles in a prescribed direction is described.

While a mold assembly 71 basically comprises a similar structure as compared with mold assembly 31 shown in FIG. 4, a superconducting coil 72 is provided around a die 32. Further, a shoe 35 is provided above die 32, in place of shoes 35a to 35c. Soft magnetic powder obtained through the aforementioned step is set in shoe 35.

According to this embodiment, the soft magnetic powder is introduced into a heating space and current is thereafter introduced into superconducting coil 72, thereby applying a magnetic field exceeding 1 (T) to the soft magnetic powder. Then, an upper punch 36 is moved downward while maintaining the state of applying the magnetic field, for pressure-forming the soft magnetic powder charged into a pressurizing space.

Soft magnetic particles 51 are pressure-formed with orientation in the extensional direction of the major axis 52 corresponding to the easy axis of magnetization, due to the application of the magnetic field. Stator core 30 having soft magnetic particles 51 so oriented that the extensional direction of major axis 52 and the extensional direction of the lines of magnetic force coincide with each other in each of yoke portion 11 and teeth portions 12 can be prepared by applying the aforementioned method.

According to stator core 30 having this structure, the frequency of the magnetic flux, flowing in stator core 30, passing particle-particle boundaries of soft magnetic particles 51 can be reduced per unit length. Thus, the permeability of stator core 30 can be increased, and flux leakage toward a slot portion 14 can be reduced. Further, desired magnetic flux density can be implemented without increasing the density of stator core 30, whereby the insulating coatings covering the surfaces of the metal magnetic particles are not broken in the pressure forming of the soft magnetic powder. Thus, iron loss of stator core 30 can be reduced.

Fifth Embodiment

Figure 7:
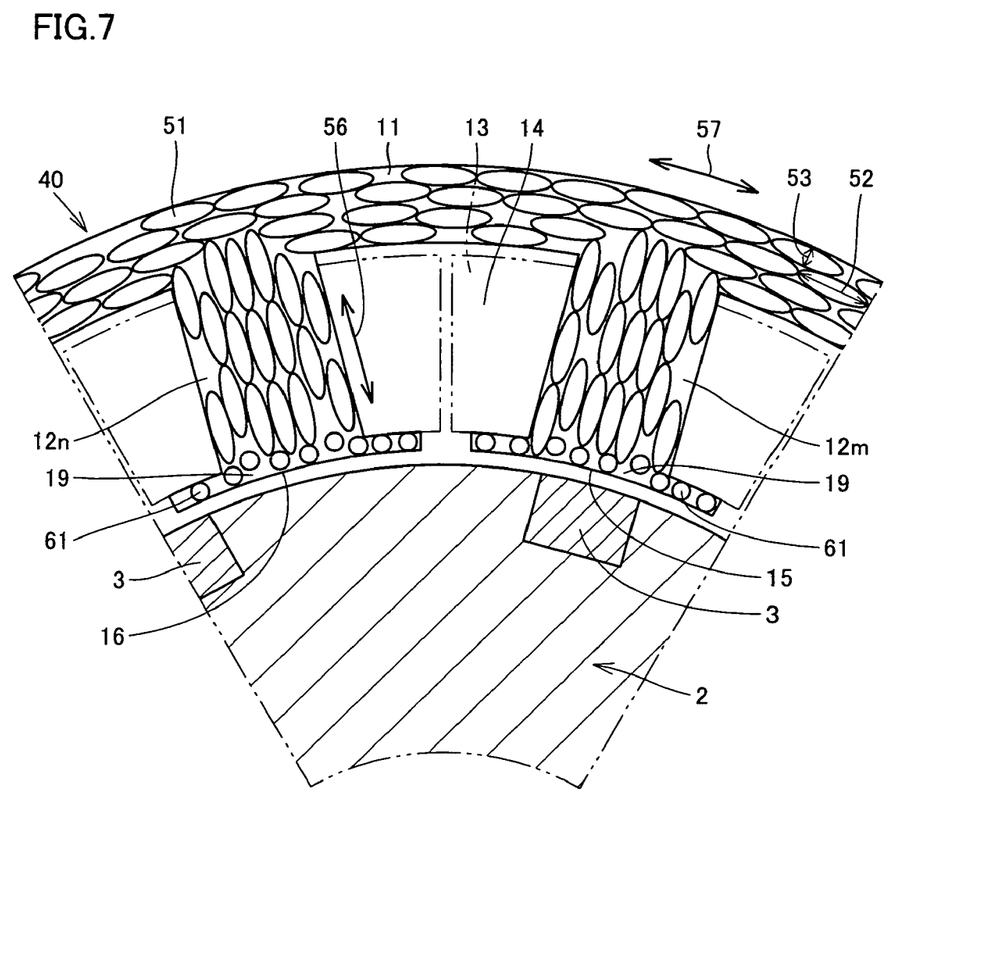
[FIG. 7] A sectional view showing an electric motor employing a stator core according to a fifth embodiment of the present invention.

FIG. 7 showing an electric motor employing a stator core according to a fifth embodiment of the present invention shows a range corresponding to FIG. 2 in the first embodiment, and schematically illustrates soft magnetic particles forming the stator core in an enlarged manner. The stator core according to the fifth embodiment of the present invention basically comprises a similar structure as compared with the stator core according to the fourth embodiment. Hereinafter redundant description is not repeated as to overlapping structures.

Referring to FIG. 7, forward end portions 19 of teeth portions 12 are formed by a plurality of spherical soft magnetic particles 61 bonded to each other in a stator core 40 according to this embodiment. Soft magnetic particles 61 are arranged on the parts where teeth portions 12 face the outer peripheral surface of a rotor core 2.

According to stator core 40 having this structure, effects similar to the effects described with reference to the fourth embodiment can be attained. The direction of magnetic flux traveling between rotor core 2 and teeth portions 12 regularly changes following rotation of rotor core 2. Spherical soft magnetic particles 61 are so arranged on positions changing this magnetic flux that magnetic isotropy can be ensured on these portions. Thus, such a situation that the magnetic flux hardly flows depending on the direction of the magnetic flux can be avoided.

Sixth Embodiment

A stator core according to a sixth embodiment of the present invention basically comprises a similar structure as compared with stator core 40 according to the fifth embodiment. Hereinafter redundant description is not repeated as to overlapping structures.

According to this embodiment, the stator core is constituted of a yoke portion 11 and teeth portions 12 separately formed by pressure forming and combined with each other. A method of manufacturing the stator core according to the sixth embodiment of the present invention is described with reference to FIGS. 8 and 9.

Figure 8:
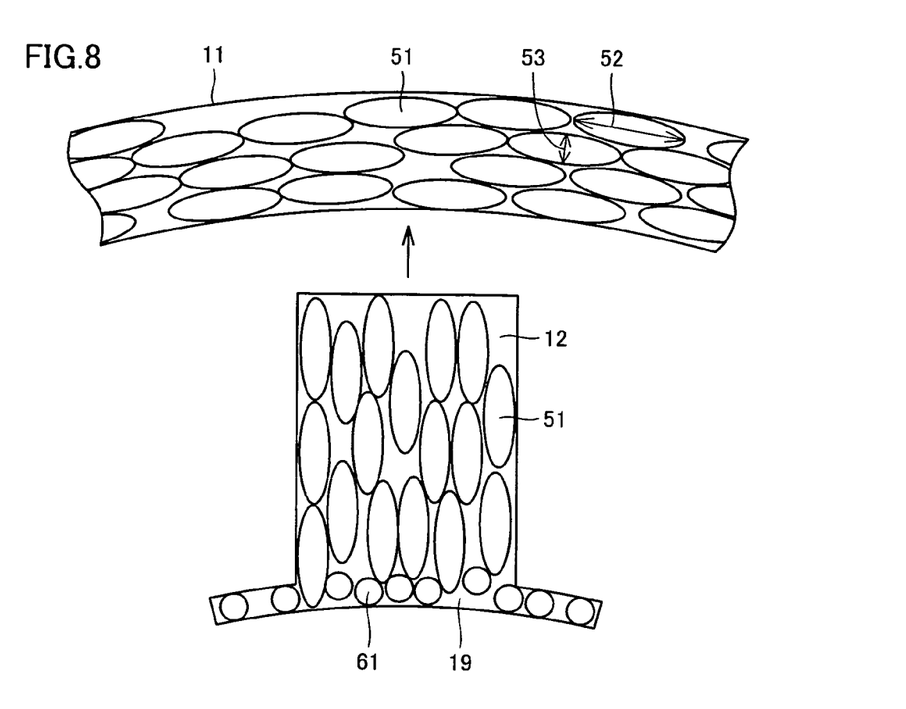
[FIG. 8] A sectional view showing a step of a method of manufacturing a stator core according to a sixth embodiment of the present invention.
Figure 9:
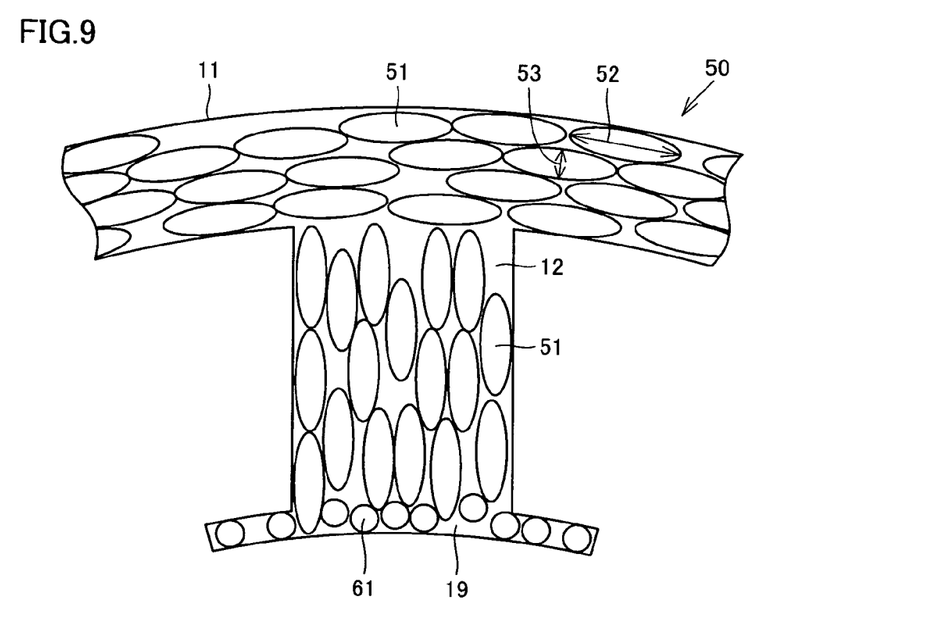
[FIG. 9] A sectional view showing another step of the method of manufacturing a stator core according to the sixth embodiment of the present invention.

Referring to FIG. 8, yoke portion 11 and teeth portions 12 having major axes 52 oriented in prescribed directions respectively are separately prepared by performing a pressure forming step. Referring to FIG. 9, a stator core 50 is completed by combining obtained yoke portion 11 and teeth portions 12 with each other. At this time, recesses and protrusions may be formed on yoke portion 11 and teeth portions 12 respectively in the pressure forming step, so that the recesses and the protrusions are engaged with each other for combining the portions with each other.

According to stator core 50 having this structure, effects similar to the effects described with reference to the fourth embodiment can be attained. In addition, the pressure forming step can be easily carried out by separately preparing the portions where soft magnetic particles 51 are oriented in different directions.

Seventh Embodiment

A stator core according to a seventh embodiment of the present invention basically comprises a similar structure as compared with the stator core according to the fourth embodiment. Hereinafter redundant description is not repeated as to overlapping structures.

Figure 10:
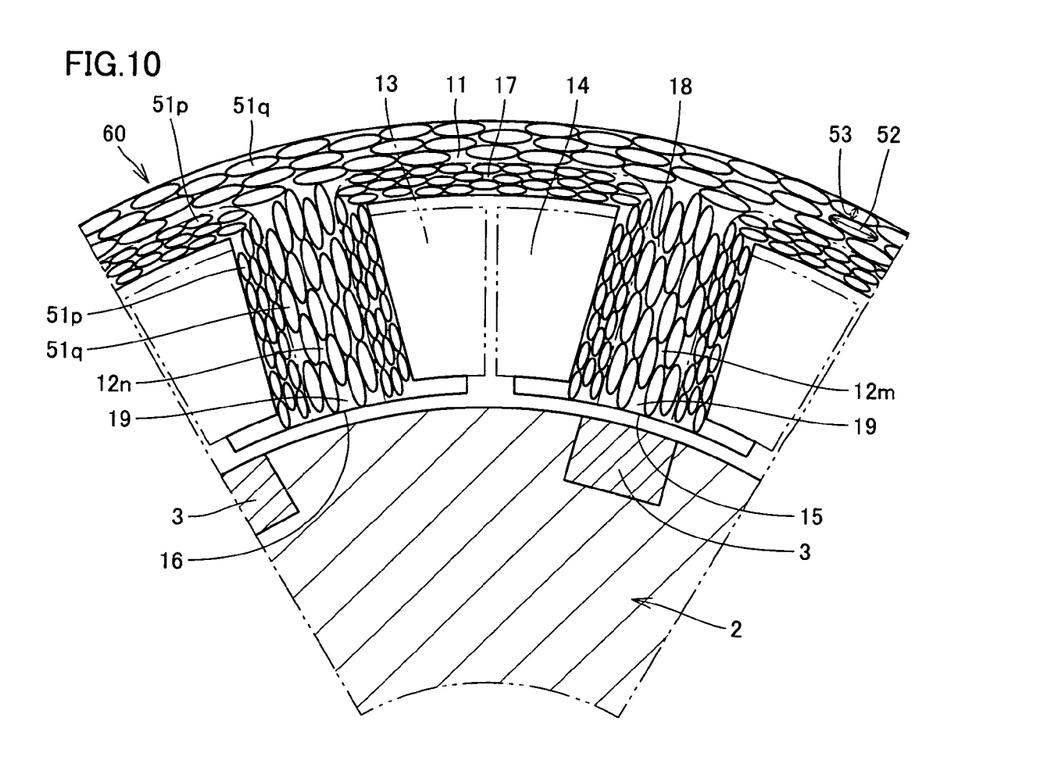
[FIG. 10] A sectional view showing an electric motor employing a stator core according to a seventh embodiment of the present invention.

Referring to FIG. 10, a stator core 60 is formed by two types of soft magnetic particles 51p each having a relatively short major axis 52 and soft magnetic particles 51q each having a relatively long major axis 52 according to this embodiment. Soft magnetic particles 51p are arranged on first portion 17 according to the first embodiment, and soft magnetic particles 51q are similarly arranged on second portion 18 according to the first embodiment. Soft magnetic particles 51p and 51q are so oriented that the extensional direction of lines of magnetic force and the extensional direction of major axis 52 coincide with each other in each of a yoke portion 11 and teeth portions 12.

According to stator core 60 having this structure, the effects described with reference to the first and fourth embodiments can be attained at the same time. Thus, iron loss of stator core 60 can be remarkably reduced.

The embodiments disclosed this time must be considered as illustrative and not restrictive in all points. The scope of the present invention is shown not by the above description but by the scope of claim for patent, and it is intended that all modifications within the meaning and range equivalent to the scope of claim for patent are included.

INDUSTRIAL APPLICABILITY

The present invention is mainly utilized for manufacturing a power magnetic core and a stator core each prepared by pressure-forming soft magnetic powder.

The invention claimed is:

1. A stator core prepared by employing a power magnetic core having a start section and a termination section and formed therein with lines of magnetic force extending in a prescribed direction from said start section toward said termination section, the power magnetic core comprising: a plurality of flat soft magnetic particles, each including a major axis and a minor axis, bonded to each other, wherein each of said plurality of soft magnetic particles is so bonded that the extensional direction of said major axis and the extensional direction of said lines of magnetic force substantially coincide with each other, the stator core comprising:

an annularly extending yoke portion; and a plurality of teeth portions, protruding from said yoke portion in the radial direction of said yoke portion, provided at intervals from each other, wherein each of said plurality of soft magnetic particles forming said yoke portion is so bonded that the extensional direction of said major axis and the extensional circumferential direction of said yoke portion substantially coincide with each other, and each of said plurality of soft magnetic particles forming said teeth portions is so bonded that the extensional direction of said major axis and the radial direction of said yoke portion substantially coincide with each other, wherein a slot portion is defined in a space enclosed with two adjacent said teeth portions and said yoke portion, and said yoke portion and said plurality of teeth portions include a first portion extending along said slot portion and having a permeability $\mu a$ and a second portion extending on the opposite side of said slot portion with respect to said first portion and having a permeability $\mu b$ greater than said $\mu a$.

2. The stator core according to claim 1, wherein:

said plurality of flat soft magnetic particles comprises first flat soft magnetic particles and second flat soft magnetic particles, said first flat soft magnetic particles define said first portion and have a first average length of said major axis, said second flat soft magnetic particles define said second portion and have a second average length of said major axis, and said first average length of said major axis is smaller than said second average length of said axis.

3. A power magnetic core, having a start section and a termination section, formed therein with lines of magnetic force extending from said start section toward said termination section, the powder magnetic core comprising:

a first portion, having a permeability $\mu a$, disposed on the shortest magnetic path of said lines of magnetic force connecting said start section and said termination section with each other; and a second portion, having a permeability $\mu b$ greater than said $\mu a$, disposed apart from the shortest magnetic path of said lines of magnetic force, wherein said first portion contains soft magnetic powder having a first average particle diameter, and said second portion contains soft magnetic powder having a second average particle diameter, wherein the first average particle diameter is smaller than the second average particle diameter.

4. A power magnetic core, having a start section and a termination section, formed therein with lines of magnetic force extending from said start section toward said termination section, the powder magnetic core comprising:

a first portion, having a permeability $\mu a$, disposed on the shortest magnetic path of said lines of magnetic force connecting said start section and said termination section with each other; and a second portion, having a permeability $\mu b$ greater than said $\mu a$, disposed apart from the shortest magnetic path of said lines of magnetic force, wherein said first portion contains iron powder, and said second portion contains at least either Permalloy powder or Sendust powder.

5. A stator core prepared by employing a power magnetic core having a start section and a termination section and formed therein with lines of magnetic force extending from said start section toward said termination section, the power magnetic core comprising: a first portion, having a permeability $\mu a$, disposed on the shortest magnetic path of said lines of magnetic force connecting said start section and said termination section with each other; and a second portion, having a permeability $\mu b$ greater than said $\mu a$, disposed apart from the shortest magnetic path of said lines of magnetic force, the stator core comprising:

an annularly extending yoke portion;

a first teeth portion protruding from said yoke portion in the radial direction of said yoke portion so that said start section is disposed on the protruding forward end; and a second teeth portion, protruding from said yoke portion in the radial direction of said yoke portion so that said termination section is disposed on the protruding forward end, adjacent to said first teeth portion at an interval, wherein a slot portion is defined in a space enclosed with said first and second teeth portions and said yoke portion, said first portion zonally extends along a peripheral edge of said first teeth portion, said yoke portion, said second teeth portion which define said slot portion and said slot portion, and said second portion extends on the opposite side of said slot portion with respect to said first portion.

6. A stator core prepared by employing a power magnetic core having a start section and a termination section and formed therein with lines of magnetic force extending in a prescribed direction from said start section toward said termination section, the power magnetic core comprising: a plurality of flat soft magnetic particles, each including a major axis and a minor axis, bonded to each other, wherein each of said plurality of soft magnetic particles is so bonded that the extensional direction of said major axis and the extensional direction of said lines of magnetic force substantially coincide with each other, the stator core comprising:

an annularly extending yoke portion; and a plurality of teeth portions, protruding from said yoke portion in the radial direction of said yoke portion, provided at intervals from each other, wherein each of said plurality of soft magnetic particles forming said yoke portion is so bonded that the extensional direction of said major axis and the extensional circumferential direction of said yoke portion substantially coincide with each other, and each of said plurality of soft magnetic particles forming said teeth portions is so bonded that the extensional direction of said major axis and the radial direction of said yoke portion substantially coincide with each other, wherein said teeth portions include forward end portions disposed on the protruding forward ends of said teeth portions to face a separately provided rotor core, and said forward end portions are formed by a plurality of spherical soft magnetic particles bonded to each other.

* * * * *